Sept. 27, 1932. J. F. GAIL 1,879,171
MATTRESS MAKING PROCESS AND MACHINE
Filed March 6, 1929 10 Sheets-Sheet 1
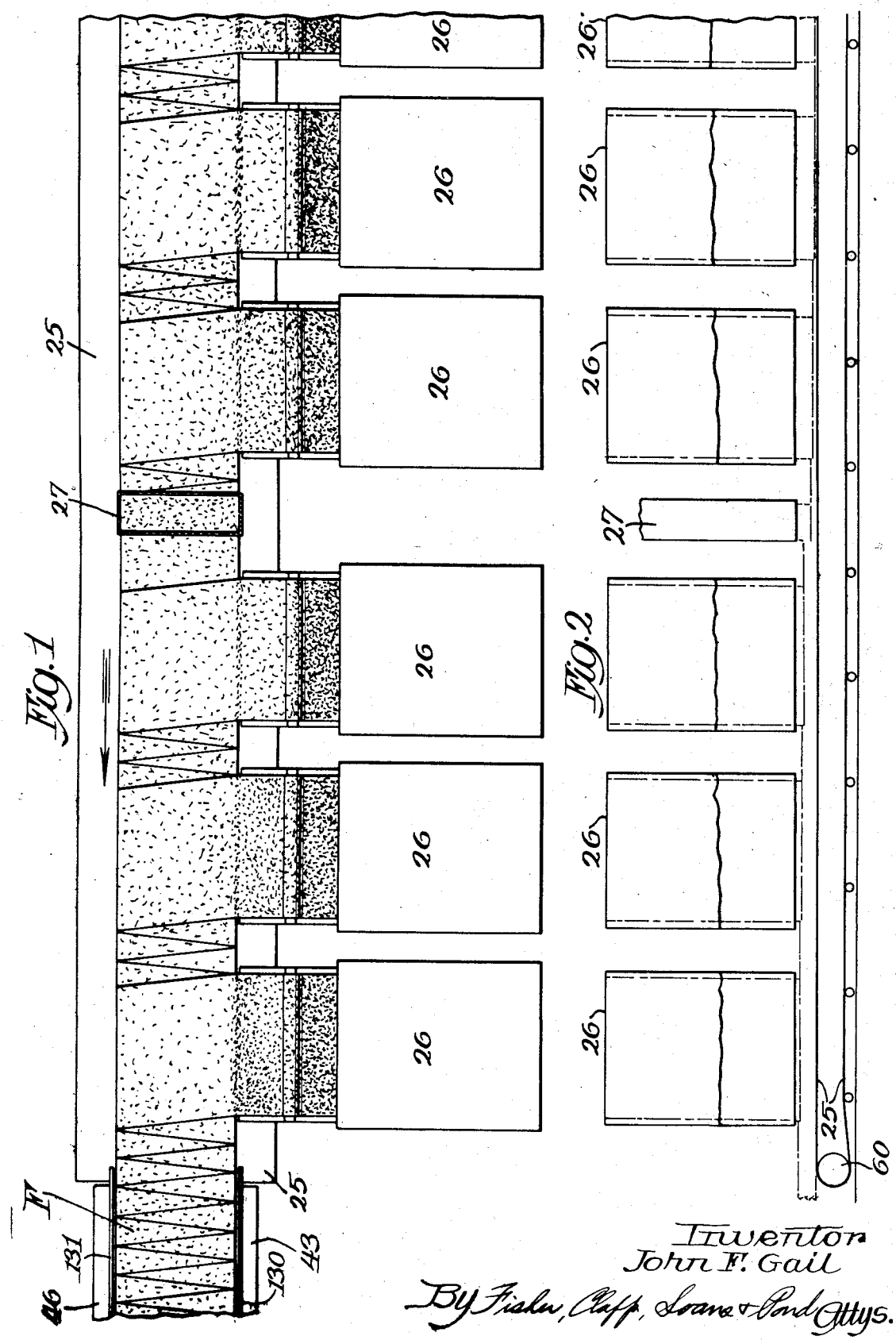

Sept. 27, 1932.   J. F. GAIL   1,879,171
MATTRESS MAKING PROCESS AND MACHINE
Filed March 6, 1929   10 Sheets-Sheet 2
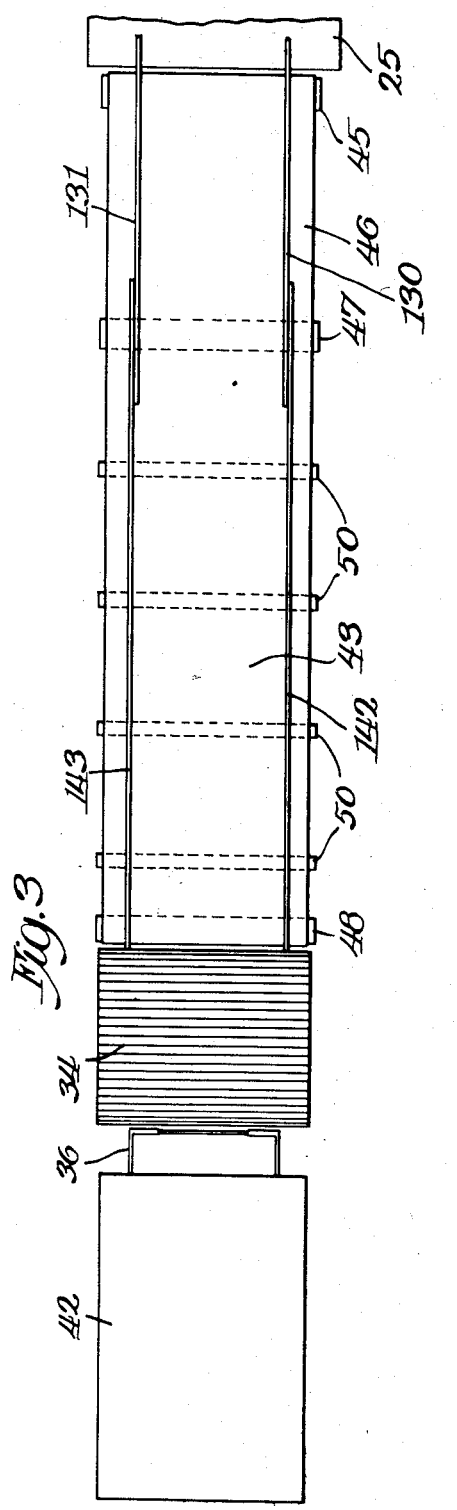
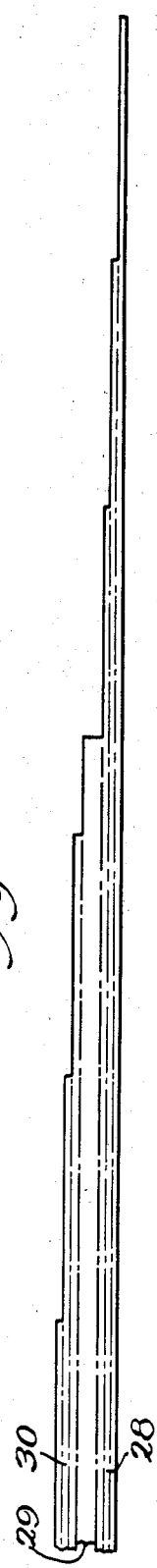
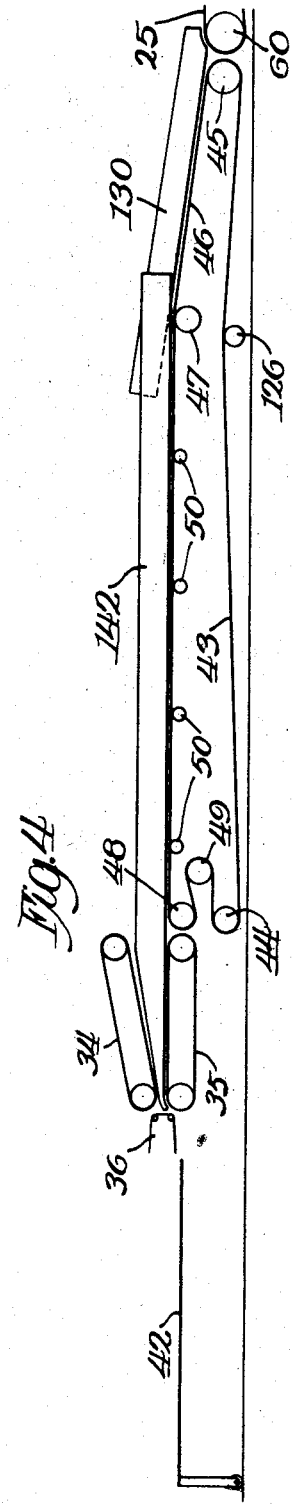
Inventor
John F. Gail
By Fisher, Clapp, Soans & Pond Attys.

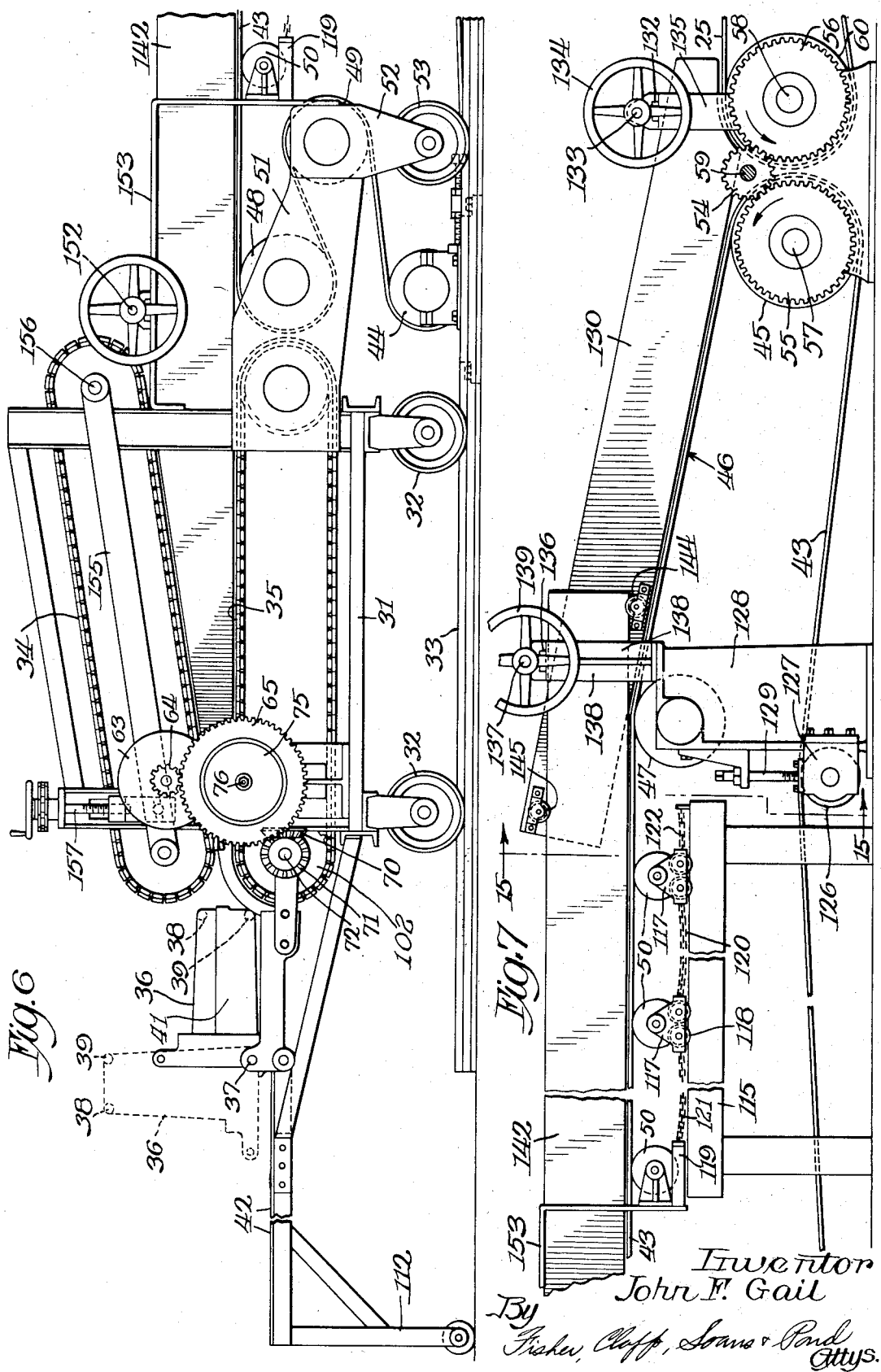

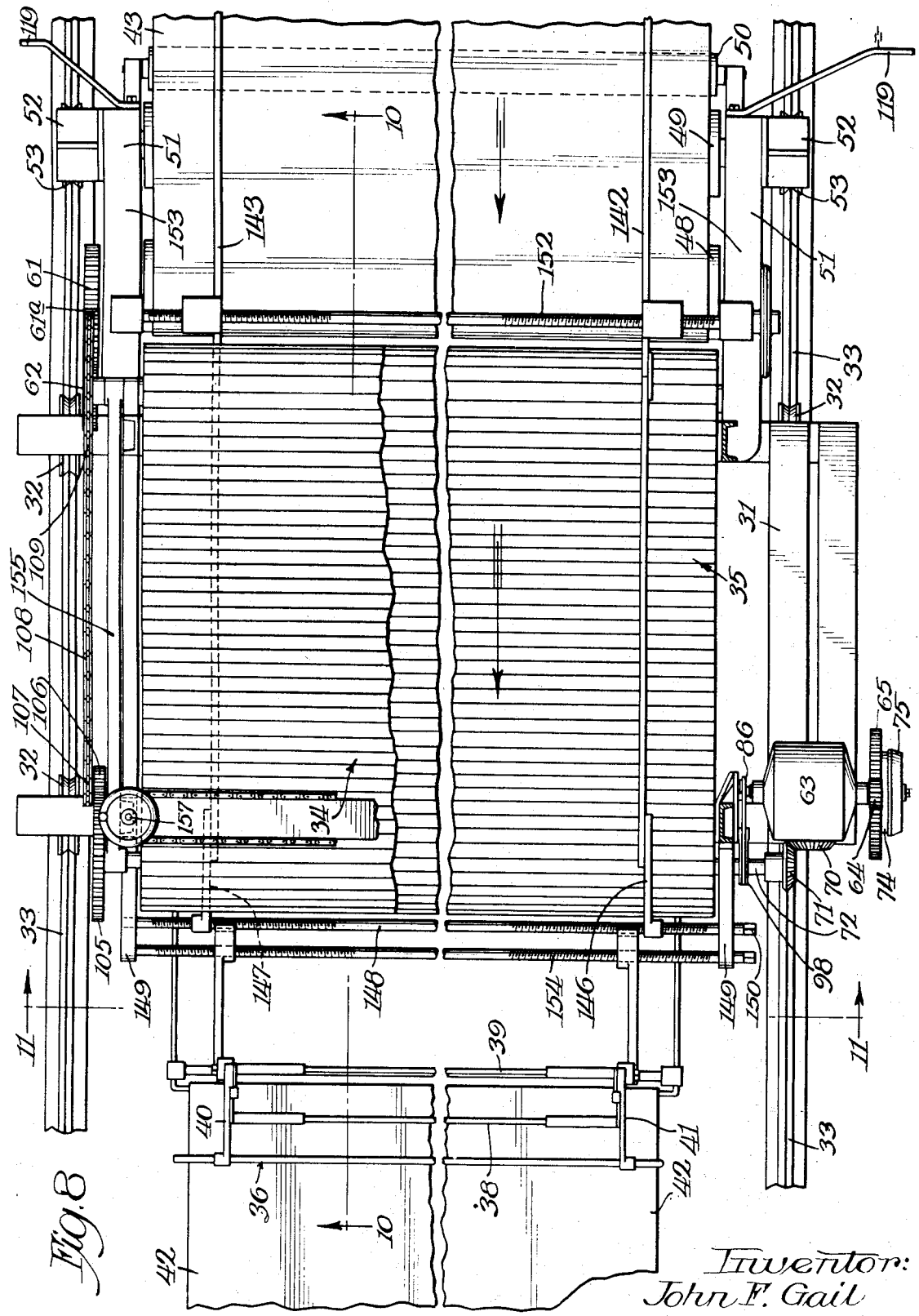

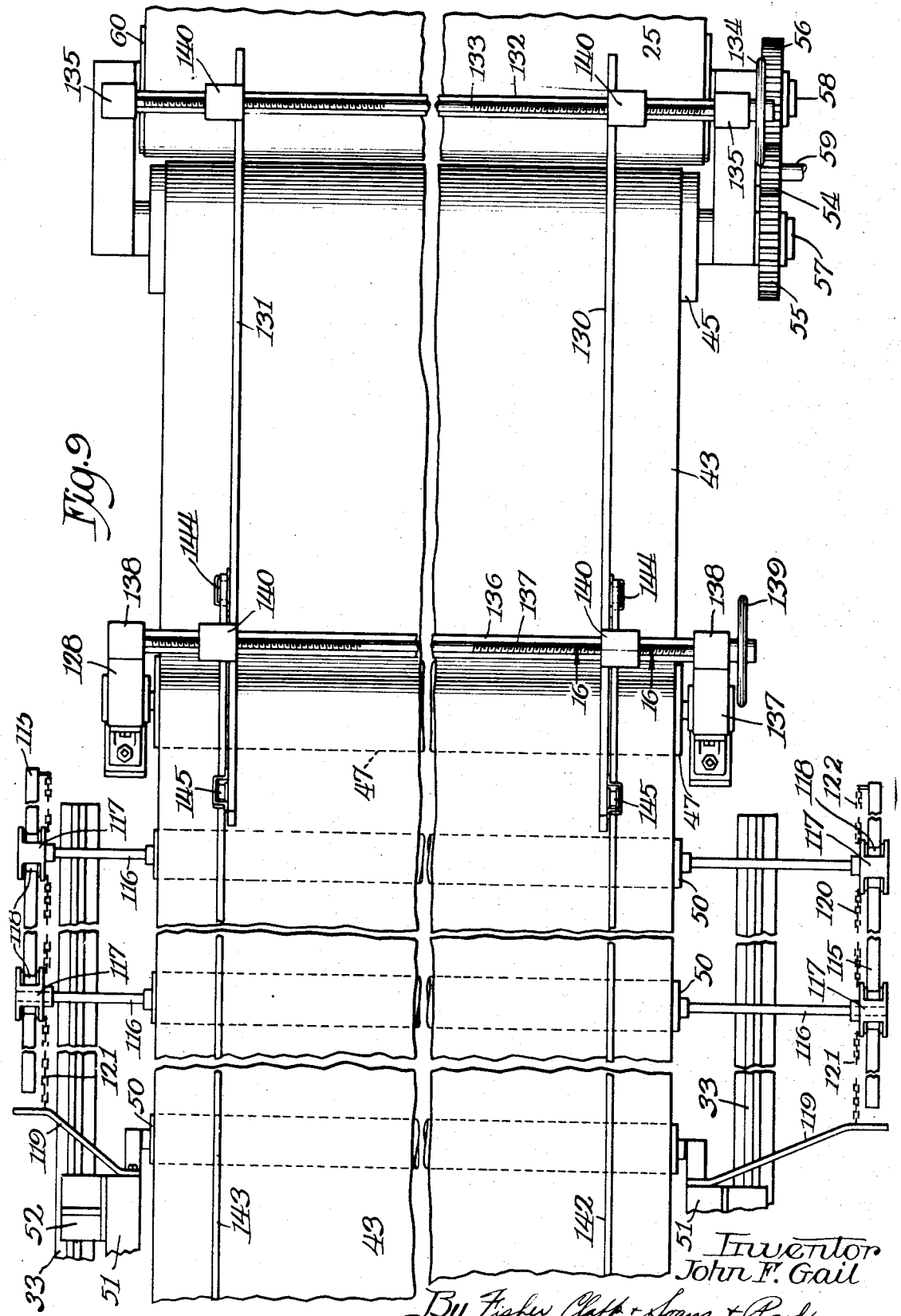

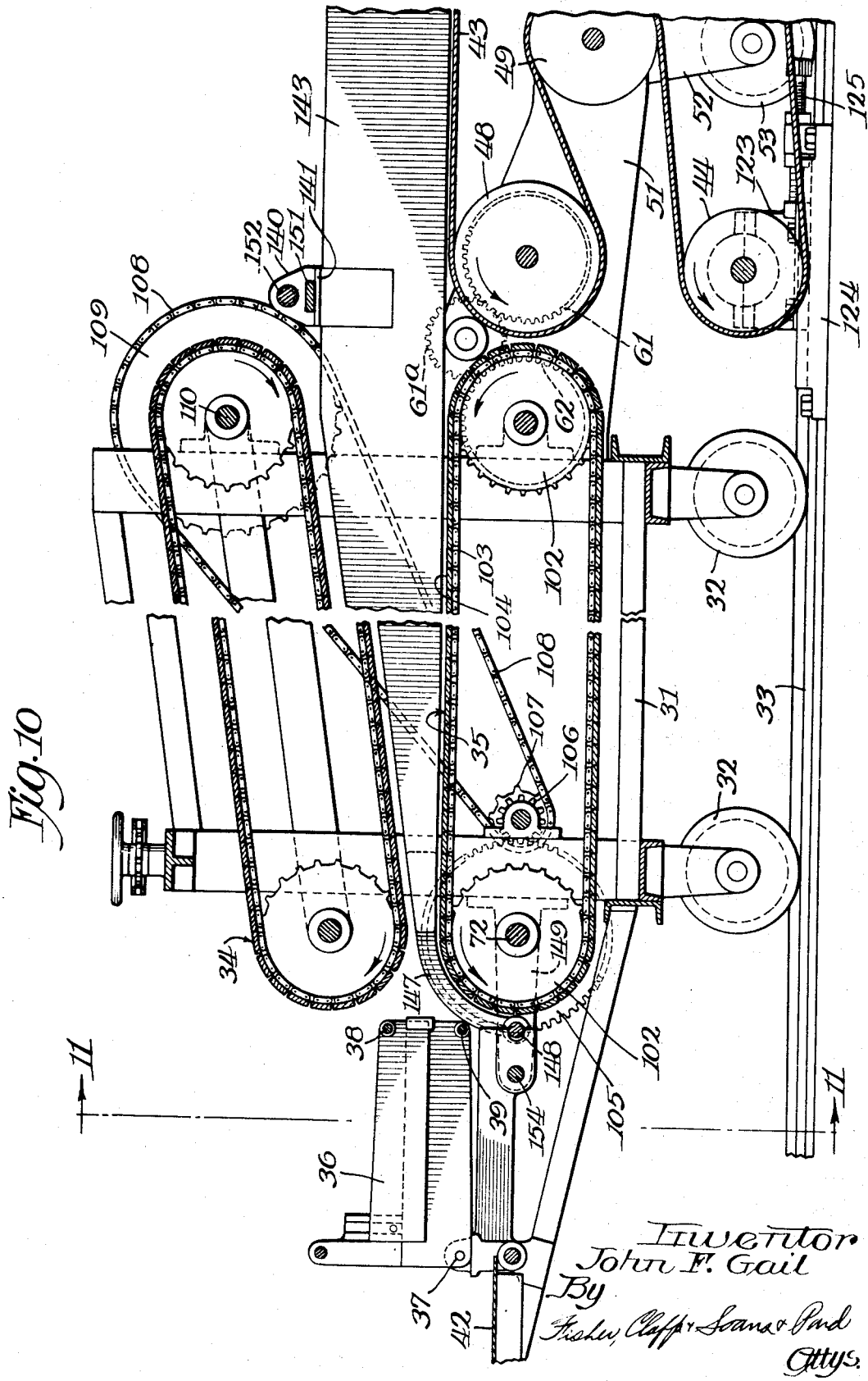

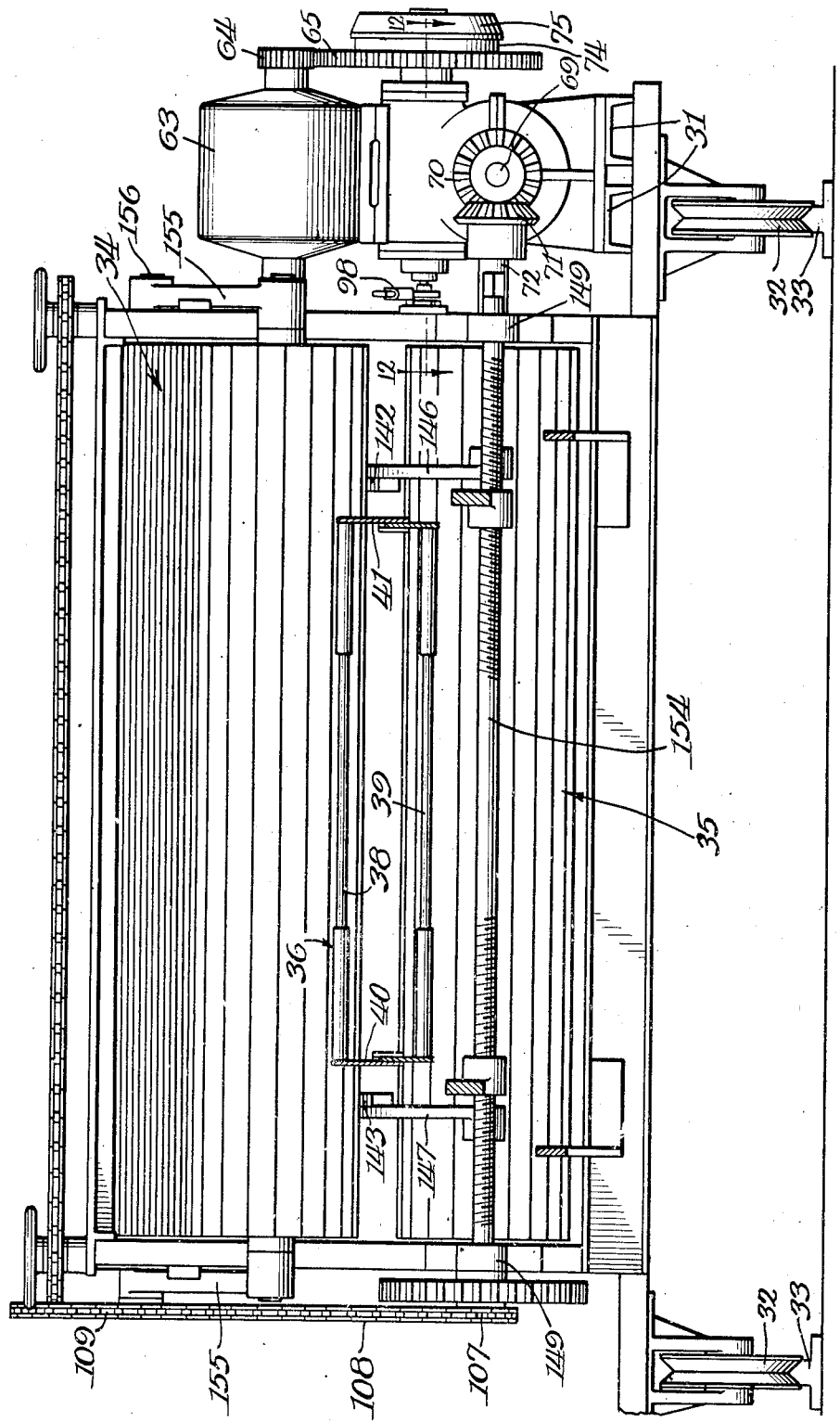

Sept. 27, 1932.   J. F. GAIL   1,879,171
MATTRESS MAKING PROCESS AND MACHINE
Filed March 6, 1929   10 Sheets-Sheet 8
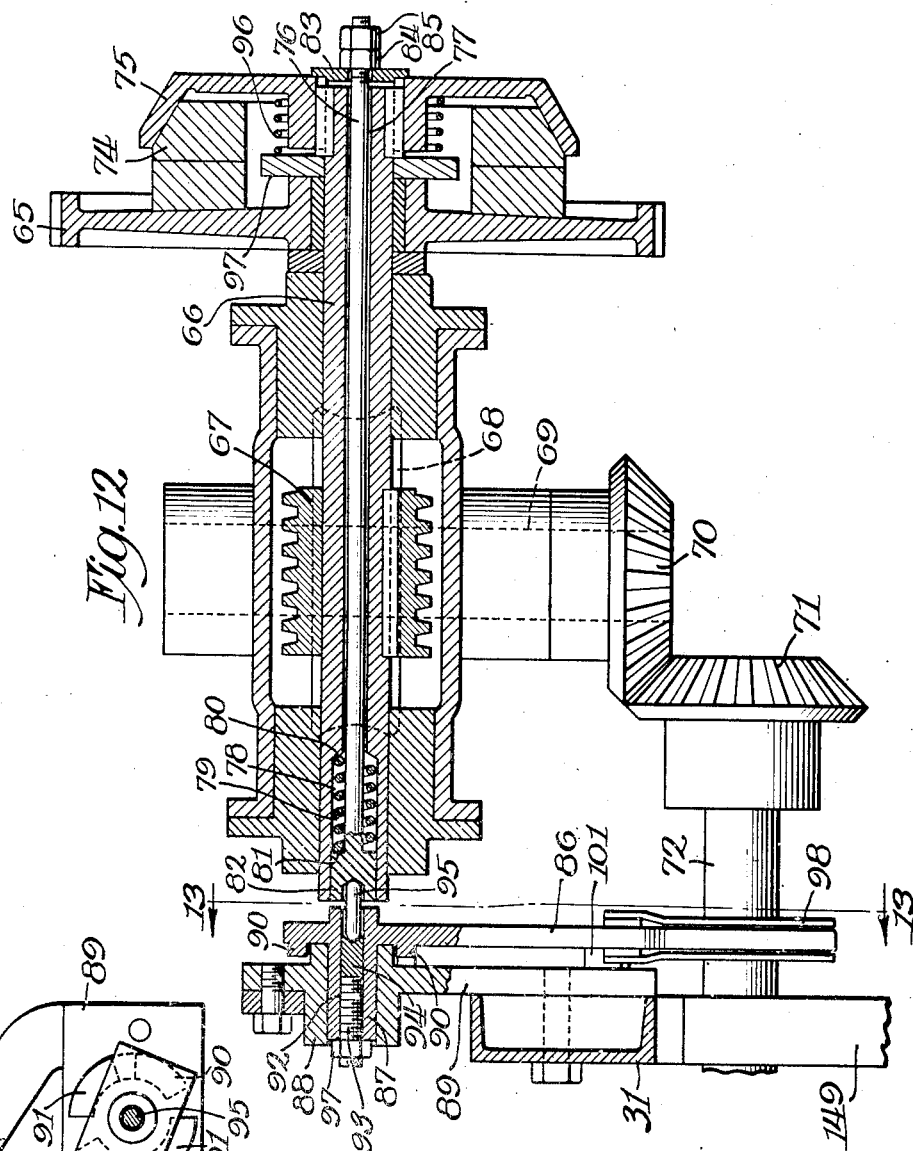
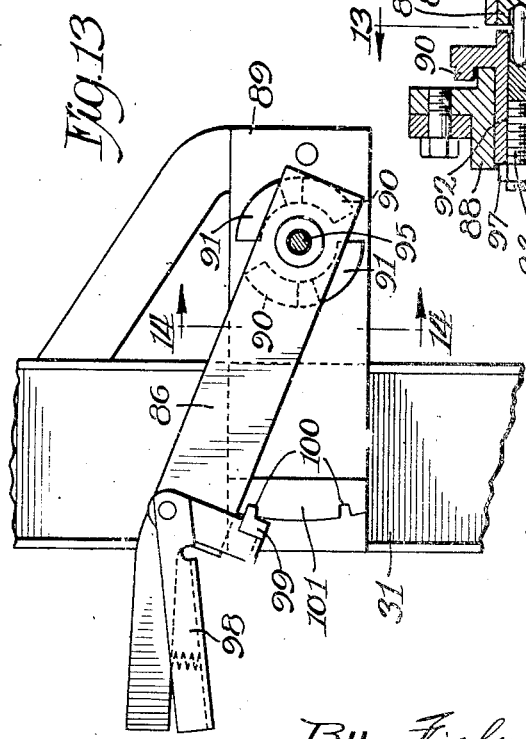
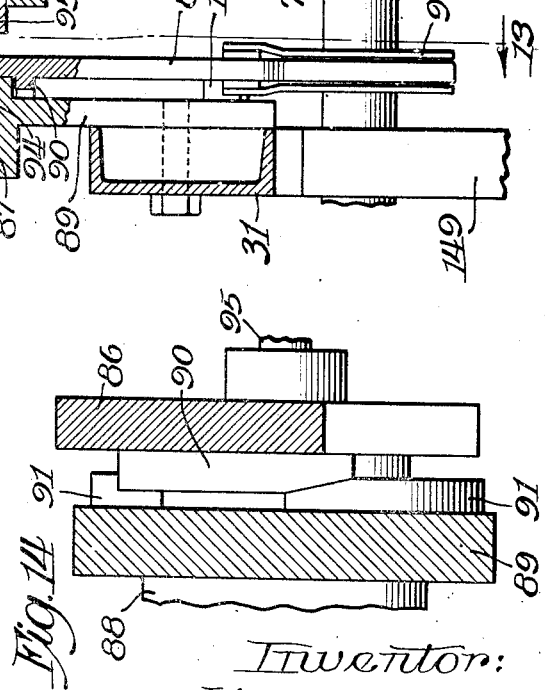
Inventor:
John F. Gail
By Fisher, Clapp, Soans & Pond  Attys.

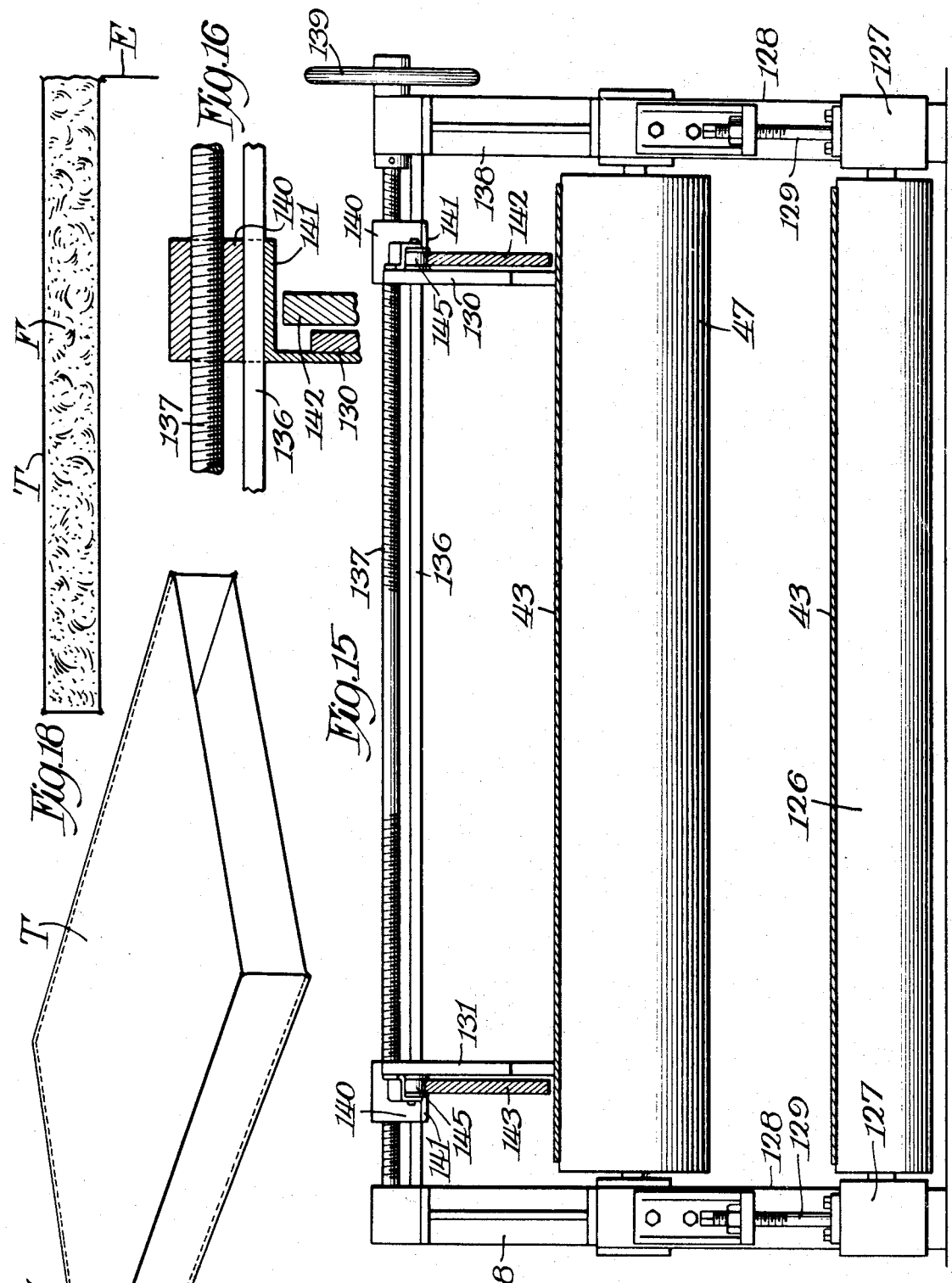

Sept. 27, 1932.                J. F. GAIL                    1,879,171
                    MATTRESS MAKING PROCESS AND MACHINE
                      Filed March 6, 1929        10 Sheets-Sheet 10
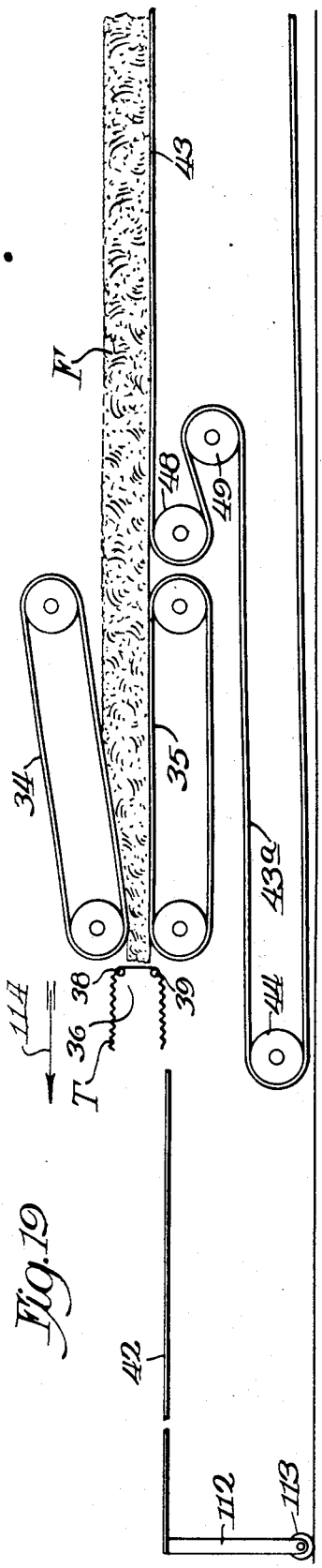
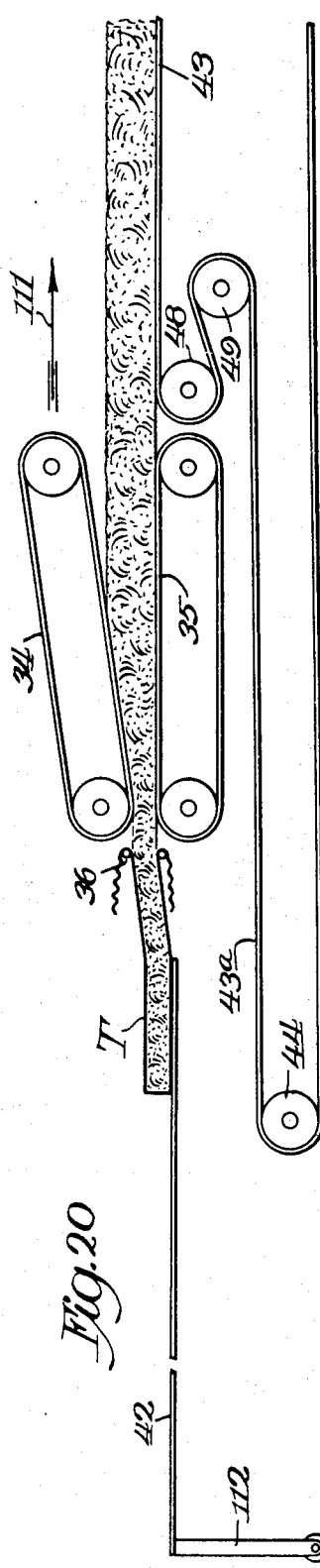
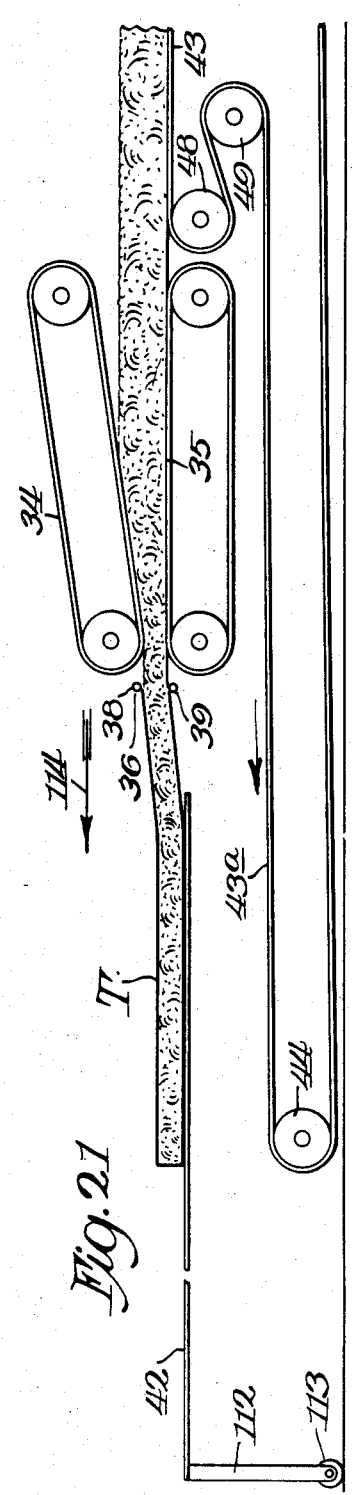
Inventor:
John F. Gail
By Fisher, Clapp, Soans & Pond
Attys Patented Sept. 27, 1932

1,879,171

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

MATTRESS MAKING PROCESS AND MACHINE

Application filed March 6, 1929. Serial No. 344,698.

This invention relates to a process and machine for making mattresses and more particularly to making mattresses continuously.

Objects of the invention are to provide a process and machine for the production of a continuous filler-web of mattress thickness, to produce such a web which is adapted for composite or "plated" mattresses, to produce a filling machine adapted to handle a continuously formed filler web.

Other objects of the invention are to provide a machine of the class above referred to which is adjustable to fill mattresses of various widths or depths; to provide a machine which is simple and easily operated by a more or less unskilled person, to provide a machine wherein the mattress filling operation is more quickly performed than has heretofore been possible; and, in general, it is the object of my invention to provide an improved machine for filling mattress ticks.

Other objects and advantages will be understood by reference to the following specification and the accompanying drawings in which I have illustrated a mattress filling machine embodying a selected form of my invention.

Figs. 1 and 2 are diagrammatic plan and side elevations respectively, of a machine for continuously forming a mattress filling supply strip.

Figs. 3 and 4 are diagrammatic plan and side elevations respectively, of a mattress tick filling machine embodying the features of my invention and adapted to be associated with the supply strip forming machine shown in Figs. 1 and 2.

Fig. 5 is a diagrammatic side elevation illustrating the formation of the filling material supply strip.

Fig. 6 is a side elevation of the part of the machine diagrammatically shown in the left hand portion of Fig. 4.

Fig. 7 is a side elevation of that part of the machine diagrammatically illustrated in the right hand portion of Fig. 4.

Fig. 8 is a plan of the mechanism shown in Fig. 6, certain parts being broken away to facilitate illustration.

Fig. 9 is a plan of the mechanism shown in Fig. 7.

Fig. 10 is a section on the line 10—10 of Fig. 8.

Fig. 11 is a section on the line 11—11 of Figs. 8 and 10.

Fig. 12 is a section on the line 12—12 of Fig. 11.

Fig. 13 is a section on the line 13—13 of Fig. 12.

Fig. 14 is a section on the line 14—14 of Figs. 12 and 13.

Fig. 15 is a section on the line 15—15 of Fig. 7.

Fig. 16 is a section illustrating a detail of construction of a part of Fig. 15, this section being taken on the line 16—16 of Fig. 9.

Fig. 17 is a perspective of a mattress tick having one end open to permit filling thereof by my approved machine.

Fig. 18 is a diagrammatic section of a filled mattress tick; and

Figs. 19, 20 and 21 are diagrammatic illustrations of the mode of operation of my improved machine.

Referring now to the drawings, I have indicated diagrammatically in Figs. 1 and 2, a conveyor 25 which constitutes a part of a so called camel back, Garnett machine, well known in the art, for forming a continuous strip of filling material. The belt 25 is continuously propelled and supported in any approved manner and a plurality of so-called camel back machine units 26—26 are provided, each serving to deposit a comparatively thin sheet or layer of cotton or other suitable mattress filling material on the said conveyor. These camel back units each have a discharge end which travels back and forth across the conveyor belt 25, thereby forming a sort of zig-zag layer-built mattress filling supply strip. In the present instance, I prefer to group the units 26 in groups of three, as shown in Fig. 1, between which a chute 27 is located for supplying filling material to the conveyor on top of an initial treble layer of cotton or other material distributed on the conveyor belt by means of the first set of machine units 26. As shown in Figs. 1 and 2, the three units 26 at the right hand side of the figures constitute the first series, and the three units at the left hand side of the figures constitute the second series, the chute 27 being interposed therebetween.

It will be readily understood that the arrangement shown is effective to form a composite strip of filling material on the conveyor 25, the make up of which strip is shown in Fig. 5. The first three machine distributing units 26 serve to form a bottom layer 28 of the desired material, this layer being in effect, a treble layer since it is formed by three separate layers of material deposited by the initial series of distributing units. An intermediate layer 29 of suitable material is deposited on top of the bottom layer 29 by means of the chute 27, the thickness of this intermediate layer being adjusted to suit requirements and a third or top layer 30 of filling material is deposited on top of the said intermediate layer 29. The top layer 30 is also formed of three separate layers of material deposited by the second set of three distributing units 26. The intermediate layer 29 may conveniently be formed of an inferior quality of material while the outer layers 28 and 30 may be formed of a higher quality material.

It will be understood that machines of the type above described operate continuously and that it is objectionable for many reasons to stop the operation of these machines. Hence, in order to maintain uniformity of the thickness of the finished three layer or composite mattress filler strip, it is necessary to maintain continuous travel of the conveyor 25 on which the material is originally deposited.

Heretofore, in the manufacture of mattresses, particularly in the filling of mattress ticks with strips of filling material, such as shown in Fig. 5, it has not been found entirely practicable to feed the strip of filling material continuously to the tick filling mechanism, partly for the reason that the operation of filling a mattress tick cannot be performed in a wholly continuous operation. Accordingly, it has been more or less necessary to interrupt the continuous travel of the strip of filling material formed by the mechanism above described in connection with Figs. 1 and 2.

By my present invention, I provide a machine for filling mattress ticks, which machine is so arranged that the continuous travel of the filling strip need not be interrupted.

The mattress tick filling machine shown in the present instance, includes a main supporting frame 31 (see Fig. 6) which is mounted on wheels 32—32 so as to be portable. Rails 33—33 are provided for receiving the wheels 32 and thereby guiding the movement of the portable frame. A pair of conveyors 34 and 35 are carried by the portable frame 31 and are arranged to receive the strip of filling material and to feed the same into a mattress tick. The conveyors 34 and 35 are preferably arranged to converge, as shown in Fig. 10 so that the strip of material received thereby is compacted or compressed so that it will readily enter into the mattress tick. A mattress tick holder indicated generally at 36 is carried by the portable frame 31, the said tick holder being of generally well known construction and pivotally mounted as shown at 37 so as to permit pivotal movement thereof from operative position, as shown in Fig. 10, to a vertical position for facilitating the application or mounting of an empty mattress tick thereon. It will be understood by those skilled in the art that a mattress tick is placed on the tick support 36 in inverted position so that the inner face of one end of the tick is disposed between the bars 38 and 39 which extend between the side members 40 and 41 of the tick support.

When a tick is mounted on the tick support, as above described, and a filler of the desired material is fed between the conveyors 34 and 35, the strip of filling material is fed endwise against the end wall of the tick which is stretched between the bars 38 and 39. Continued movement of the filling material strip causes the end wall of the tick to pass between the bars 38 and 39 and the sides of the tick to be drawn around the bars or rolls 38 and 39 to cover the filling material which is fed between the said bars 38 and 39. The filled portion of the tick may be supported by means of a suitable table such as indicated at 42, which is preferably attached to the portable frame so as to be movable therewith. In accordance with well known practice, the conveyors 34 and 35 are adjustable to control the extent of compression of the filling material strip and the tick support 36 is also adjustable to accommodate various sizes of mattress ticks. The tick supporting and filling mechanism above described is generally well known in the art and hence, need not be further described in detail. However, so far as I am aware, it is not old to mount the supporting frame on wheels or in any other manner to make the same portable, as above described.

Suitable mechanism for actuating the conveyors 34 and 35 is provided and will be hereinafter described.

According to the present invention, I may continue the receiving conveyor belt 25 outwardly to a suitable point for delivering the strip of material to the mattress filling mechanism above described and so as to permit the incorporation of certain features which I will presently describe. However, I prefer to provide a separate and independently driven conveyor 43 which includes front and rear supporting rolls 44 and 45 (see Figs. 4, 6 and 7). The rear end of the conveyor, which is the receiving end, is preferably disposed substantially co-planar with the discharge end of the strip forming machine conveyor 25, as shown in the said Figs. 4 and 7. An initial portion of the feed conveyor 43 is preferably inclined upwardly as indicated at 46, so as to pass over a supporting roll 47 from which point the main length of the conveyor extends substantially horizontally and passes around a pair of rollers 48 and 49 to form an offset in the upper reach of the conveyor which extends between the front and rear supporting rolls 44 and 45, substantially as shown. The length of the said conveyor 43 between the front supporting roll 44 and the upper reach supporting roll 47, is preferably considerably greater than the length of an ordinary mattress and a plurality of intermediate supporting rolls 50—50 are provided for supporting the upper reach of the conveyor intermediate the rolls 48 and 47.

The offset forming rolls 48 and 49 are rotatably mounted in brackets such as 51, which are secured at one end to the portable frame 31 and supported at their rear ends by means of legs 52 in which wheels 53 are rotatably mounted and adapted to engage the tracks 33.

The feed conveyor 43 is normally driven at the same rate of speed as the conveyor 25 of the strip forming machine, so that the strip of filling material will be continuously and uniformly fed forward by the conveyor 25 to the feed conveyor 43 and by the latter towards the tick filling mechanism above described. Any suitable means may be provided for effecting uniform speed of travel of the conveyor 25 and 43, and, in the present instance, I provide a pinion gear 54 which meshes with gears 55 and 56 carried by the shafts 57 and 58 respectively, of the conveyors 43 and 25. The pinion 54 may be carried by a rotatably mounted drive shaft 59 which may be driven in any suitable manner. It being understood that the gears 55 and 56 are of like pitch diameters, it will be obvious that rotation imparted thereto by the pinion gear 54 will impart the same speed of rotation to the shafts 57 and 58. The rear roll 45 of the conveyor 43 and the front roll 60 of the conveyor 25 are, of course, of the same diameter so that the same speed of travel will be imparted to the conveyor belts 43 and 25.

The offset forming roll 48 is connected by means of gears 61 and 62 and an intermediate pinion 61ª, to the conveyor 35 of the tick filling mechanism so that when the conveyors 34 and 35 are actuated, the roll 48 will also be incidentally rotated independent of the rotation imparted thereto by the travel of the feed conveyor belt 43. For actuating the conveyors 34 and 35, I prefer to provide an electric motor indicated at 63, which motor is mounted by means of suitable brackets and supports on the portable frame 31. The motor shaft is provided with a pinion 64 which meshes with a gear 65, the latter being rotatably mounted on a shaft 66 but adapted to be clutched thereto so as to effect rotation of the same. Clutch mechanism for effecting driving engagement between the gear 65 and the shaft 66 will presently be described. As best shown in Fig. 12, the shaft 66 carries a worm gear 67 which meshes with a worm wheel 68, the latter being mounted on a shaft 69 rotatably mounted in suitable bearings provided in the motor support. A bevelled gear 70 is mounted on the outer end of the shaft 69 and meshes with a similar gear 71 which is secured to one end of the shaft 72 on which is mounted a sprocket which constitutes a part of conveyor 35.

The above mentioned clutch mechanism includes a clutch part 74 which is secured to the gear 65 and another clutch part 75 which is keyed to the shaft 66. The clutch parts 74 and 75, in the present instance, are in the form of a cone clutch, as clearly shown in Fig. 12, and engagement or disengagement of the clutch parts is controlled through the agency of a rod 76 which is disposed in an axial bore 77 provided in the shaft 66. The bore 77, at the inner end of the shaft 66 is enlarged as shown at 78 to provide a receptacle for a coil spring 79 which is disposed around a part of the rod 76 and is normally compressed between the bottom 80 of the enlarged bore 78 and the shoulder 81 formed by an enlarged end portion 82 of the rod 76. The spring 79 normally tends to move the control rod 76 inwardly, that is to the left in Fig. 12, and a collar or washer 83 on the rod 76 serves to transmit such movement of the rod to the clutch part 75, whereby the latter will be yieldingly held in driving engagement with the clutch part 74. The collar or washer 83 is axially slidable on the rod 76, a nut 84 and lock nut 85 being provided for adjustably positioning the washer on the rod 76.

The clutch controlling rod 76 is adapted to be manually controlled by means of a hand lever 86 which is provided with a hub part 87 rotatably mounted in a suitable bearing 88 provided in a bracket 89 which is secured to an upright part of the portable frame 31. The hand lever 86 is provided with laterally projecting cams 90—90, which are adapted to act against similar cams 91—91 formed on the face of the bracket 89. The cams 90 and 91 are operative to force the hand lever 86 away from the bracket 89 when the hand lever is rotated.

The hub 87 of the hand lever is drilled out as indicated at 92 and a part of the bore is internally threaded to receive an adjusting screw 93 which serves to position a wear block 94 in the bore. A pin 95 interposed between the wear block 94 and the enlarged end 82 of the control rod 76 serves to transmit lateral movement of the lever 86 to the control rod 76.

It will thus be seen that when the hand lever 86 is shifted so that the cams 90 and 91 coact to force the lever away from the bracket 89, the rod 76 will be moved outwardly, that is, to the right in Fig. 12. When the rod 76 is so moved outwardly, a spring 96 which is interposed between the clutch part 75 and a collar 97, which is positioned against the hub of the gear wheel 65, urges the clutch part 75 to move out of engagement with the clutch part 74. The spring 79 is of sufficiently greater strength to normally maintain the clutch parts in operative engagement against the tendency of the spring 96 to effect disengagement thereof. However, when the spring 79 is compressed by the above described cam action on the hand lever 86, the spring 96 is permitted to effect disengagement of the said clutch parts. It will be understood that adjustment of the clutch actuating mechanism is permitted by means of the nut and lock nut 84 and 85 respectively, which control the position of the collar 83 on the rod 76 and also by means of the adjustable set screw 93 which controls position of the pin 95 with respect to the hand lever 86. A lock nut 97 is provided for locking the set screw 93 in the desired position of adjustment. For locking the hand lever 86 in the desired position of adjustment, that is to hold the clutch out of engagement or in engagement, the hand lever is provided with a pivotally mounted and spring controlled hand grip 98 which controls a locking detent or dog 99, the latter being adapted to interlock with either one of a pair of notches 100 provided in a latch bar 101 which is mounted on the bracket 89.

It will be apparent that when the clutch parts 74 and 75 are in operative engagement, the shaft 72 of the conveyor 35 will be driven. In accordance with well known practice, the conveyor includes sprockets such as shown at 102—102 around which a chain 103 passes and which chain cooperates with a second similarly mounted chain to support a plurality of crosswise extending slats 104 which form a substantially continuous, flat conveyor surface. The conveyor 34 is of similar construction, and is driven from the shaft 72 of the conveyor 35. For so driving the conveyor 34, I provide a gear 105 on the free end of the shaft 72 and which gear meshes with a pinion 106 which is rotatably mounted in any suitable manner on a convenient part of the portable frame 31. The pinion 106 is connected to a sprocket 107 around which a chain 108 passes so as to be driven thereby. The chain 108 also passes around another sprocket 109 which is mounted on the shaft 110 of the conveyor 34. The gear ratios and pitch diameters of the sprockets which control the speed of travel imparted to the conveyor 34 are such that the conveyor 34 is driven at substantially the same speed at which the conveyor 35 is driven.

The speed at which the conveyors 34 and 35 are driven is somewhat greater than the speed at which the feed conveyor 43 is driven. Because of the gear connection 61—61ᵃ—62 between the roll 48 and conveyor 35, the roll 48 will be positively rotated at a greater speed than it would normally be rotated by the feed belt 43 which passes around the said roll. Hence, the offset forming roll 48 will roll rearwardly of the belt 43, thereby causing the tick support and filling mechanism to also move rearwardly of the feed conveyor 43, this being due to the fact that the roll 48 is rotatably mounted in the bracket 51 which is secured to the portable frame 31.

The operation of filling a mattress tick by means of my improved machine is diagrammatically illustrated in Figs. 19, 20 and 21. By reference to these figures, it will be seen that the supply strip of filling material indicated by the reference character F, is fed forwardly by the conveyor 43, the strip being fed to the conveyor 35 at the offset formed in the upper reach of the feed conveyor 43. The conveyor 34 serves to compress the strip of filling material to a thickness which will readily pass between the cross bars 38 and 39 of the tick support. An empty mattress tick T is turned inside out and mounted on the tick support as shown in Fig. 19. To start a filling operation, the conveyors 34 and 35 are actuated whereby the offset forming roll 48 is also caused to rotate. Since the roll 48 is positively rotated faster than the travel of the feed conveyor 43 would normally cause the roll to rotate, the said roll 48, conveyors 34 and 35, and tick support 36 are caused to move rearwardly of the feed conveyor 43 as indicated by the arrow 111 in Fig. 20. The actual tick filling operation is thus speeded up as compared with the ordinary method of feeding the filling material into the tick through stationary, that is, non-portable compressing conveyors, and as compared with the speed at which the filler supply strip is fed from the forming machine.

When the mattress tick is completely filled, as shown in Fig. 21, the clutch mechanism 74 and 75 is disengaged to stop the operation of the conveyors 34 and 35 and the roll 48, after which the supply strip of filling material is broken off immediately in front of the tick support bars 38 and 39. The filled mattress tick then has the appearance more or less diagrammatically illustrated in section in Fig. 18, one end of the tick being open and adapted to be closed by means of an end flap E which may or may not be secured to either the top or bottom wall of the tick before the filling operation is started.

During the filling operation above described, the mattress supporting table 42, which is connected to the portable frame 31, as indicated in Fig. 6, follows the portable frame so that the mattress is suitably supported thereon as indicated in Figs. 20 and 21. The free end of the table 42 may be supported in any suitable manner, for instance by means of legs such as 112 provided with rollers such as 113 engaging the floor. During the time in which the operator of the machine is breaking the strip of filling material in front of the tick supporting bars 38 and 39, and while the filled mattress tick is being removed and an empty tick substituted, the offset forming roll 48 and conveyors 34 and 35 are caused to move forwardly in unison with the feed conveyor 43, such return movement being due to the fact that the offset forming roll 48 is effectively locked against rotation because of its driving connection with the conveyor 35. The portable frame mechanism is readily movable because of the wheel and rail mounting thereof wherefore the belt 43 will not slip around the locked roll 48. The lower portion 43ª of the conveyor 43 will serve to pull the locked roll 48, and incidentally, the portable frame 31, forwardly towards the initial or starting position of the latter. It will be understood that the roll 48 and conveyors 34 and 35 cannot readily be caused to rotate in the reverse direction due to frictional resistance to operation of the conveyors 34 and 35 and also due to the worm and worm wheel driving gears 67 and 68, it being noted that the pitch or angle of the teeth of the worm wheel and worm is such that the worm wheel cannot effect rotation of the worm.

Return movement of the portable frame 31 with its conveyors 34 and 35 may continue until the original starting position, as shown in Figs. 4 and 6, is resumed or the return movement may be stopped as soon as an empty mattress tick has been properly mounted on the tick support to receive the filling material. For facilitating such repeated operation of the machine, that is to permit the machine to be repeatedly operated without waiting for the portable frame to be returned to its initial starting position, the feed conveyor 43 is made of considerably greater length than the length of the ordinary mattress. This length may be made to suit conditions in the building in which the machine is housed or to suit any other operating requirements. Fig. 21 illustrates the position of the machine at the time of completion of the filling of a mattress tick and Fig. 19 shows the position of the parts after the filled mattress has been removed and an empty tick substituted so that the next tick filling operation may be started. As indicated by the arrows 114, in Figs. 21 and 19, the portable frame carrying the conveyors 34 and 35 is travelling in the forward direction, that is returning in unison with the travel of the feed conveyor 43. When the condition shown in Fig. 19 is reached, return movement of the conveyors 34 and 35 may be stopped by actuating the clutch mechanisms 74 and 75 to actuate the conveyors 34 and 35, whereby these conveyors will again be caused to move rearwardly of the feed conveyor 43 and the tick filling operation repeated. As shown in Fig. 19, the parts are ready to begin a repetition of the tick filling operation before the conveyors 34 and 35 have been returned to their initial starting position, which is approximately shown in Fig. 6.

The offset, formed by the roll 48, in the upper reach of the feed conveyor 43 serves as a discharge end in the said upper reach and it will be apparent that the location of this discharge end is adjustable longitudinally of the feed conveyor 43. It will be seen that when the discharge end or offset in the feed conveyor is moved rearwardly towards the receiving end of the feed conveyor, the effective length of the feed conveyor is shortened and that a part of the length of the conveyor is robbed or emptied of filling material. As shown in Fig. 21, the portion of the upper reach of the conveyor 43ª, located between the front supporting roll 44 and the intermediate roll 49, is emptied of filling material. When the portable frame and conveyors 34 and 35 are caused to move forwardly in unison with the travel of the conveyor 43, the filling material strip forming machine continues to feed the filling material to the feed conveyor 43, thereby tending to fill up the emptied length of the feed conveyor. Of course, it will be understood that filling material is not deposited on the upper reach portion of the conveyor between the rolls 44 and 49, but that material is deposited on the receiving end of the conveyor while the offset in the upper reach thereof moves forwardly towards its initial position. The effect is, of course, to fill up the said emptied conveyor length. The table 42 is made of sufficient length to permit the same to follow the portable frame to its extreme rearward position so that operation of the machine need not be confined to the more or less forward positions shown in Figs. 19, 20 and 21.

The intermediate supporting rolls 50 which support the upper reach of the feed conveyor 43 between the offset forming roll 48 and the supporting roll 47 are movably mounted on tracks 115 located on opposite sides of the feed conveyor 43. For so mounting the supporting rolls 50, they are provided with endwise extending shafts 116 which are journalled in trucks 117, the latter being provided with wheels 118 which engage the said tracks 115. It will be apparent that when the portable frame is moved rearwardly of the conveyor 43 a sufficient distance, one or more of the supporting rolls 50 will have to be moved out of the way. This is permitted by the portable mounting of the said rolls and such movement is effected by means of bumpers such as shown at 119, which are secured to the forward ends of the brackets 51, as clearly shown in Fig. 9. These bumpers are operative to engage the front ends of the trucks 117 and thereby to cause the same to move rearwardly on the tracks 115 as made necessary by rearward movement of the portable frame 31. One of the rolls 50 may be secured to the end of the brackets 51, as best shown in Fig. 8 so that the feed conveyor belt 43 is effectively supported at all times at a short distance from the offset forming roll 48.

For causing the supporting rolls 50 to return to their initial or normal position, the trucks 117 are connected by suitable means such as chains 120, and by means of chains 121 to the bumpers 119. The rearmost supporting roll 50 may be limited against forward movement by means of a chain 122 connected between its trucks 117 and the rear ends of the tracks 115. (See Fig. 7).

For taking up slack in the feed conveyor 43, I mount the front supporting roll 44 in a bearing block 123 which is slidably mounted in a suitable base part 124 and adapted to be adjusted longitudinally thereof by means of a set screw or bolt 125. The lower reach of the feed conveyor 43 extending between the front supporting roll 44 and the rear supporting roll 45 is preferably supported intermediate its ends by means of a vertically adjustably mounted roll 126. This intermediate roll 126 is rotatably mounted in suitable bearing blocks 127 which are vertically slidably mounted on a pedestal or frame member 128 which also serves to support the intermediate supporting roll 47. Suitable screw adjusting means indicated at 129, may be provided for effecting vertical adjustment of the bearing block 127 and roll 126.

For guiding or supporting the edges of the strip of filling material on the feed conveyor 43 and between the compressing conveyors 34 and 35, I provide side guides which are preferably mounted so as to be adjustable crosswise of the conveyors, thereby facilitating use of the machine for filling mattresses of various widths. The side guides are also mounted so that at least a part of them are adjustable longitudinally in unison with the portable frame 31 so as to permit the above described movement of the latter longitudinally of the feed conveyor 43.

For guiding the strip of filling material while on the inclined receiving portion of the feed conveyor 43, I provide guide plates 130 and 131. These guide plates are supported at their front ends by means of a supporting bar 132 which extends transversely of the conveyor as clearly shown in Fig. 9, and on which bar the guide plates are slidably mounted so as to be adjustable crosswise of the feed conveyor. As screw 133 having right and left hand threads on its opposite end portions is also provided for effecting the said crosswise adjustment of the guide plates 130 and 131 on the supporting bar 132, a hand wheel 134 being secured to one end of the screw to facilitate rotation thereof. The supporting bar 132 and screw 133 are suitably supported at their opposite ends by means of upstanding posts or brackets 135 which are formed integral with or secured to frame elements in which the shafts 57 and 58 are journalled. The construction of the means for adjustably mounting the guide plates on the bar 132 and whereby the screw 133 is effective to adjust the guide plates will hereinafter be more fully described.

The opposite ends of the guide plates 130 and 131 are similarly mounted on a supporting bar 136 and a screw 137 is provided for effecting crosswise adjustment thereof. By reference to Figs. 15 and 16, it will be seen that the bar 136 is supported at its opposite ends by means of posts 138 which extend upwardly from the pedestals or frame members 128 and also that the screw is rotatably supported in the upper ends of the said posts, a hand wheel 139 being provided for facilitating rotation of the screw. The guide plates 130 and 131 are respectively mounted on the bar 136 through the agency of a sliding block 140 which is provided with a notch or groove in its lower face to fit over the supporting bar 136 (see also Fig. 10). An angle iron bracket 141 is secured to the bottom face of the sliding block 140 so as to lock the block on the bar and the respective guide plates are secured to the depending flange of the angle iron by rivetting or in any other suitable manner. The upper portions of the sliding blocks 140 are provided with internally threaded apertures which respectively receive the right and left hand threading provided on the adjusting screw 137. The mounting of the forward ends of the guide plates 130 and 131 on the bar 132 and screw 133 is similar to the above described form of mounting on the bar 136 and screw 137.

For guiding the filling material on the horizontal reach of the feed conveyor 43 and through the space between the compressing conveyors 34 and 35, I provide guide plates 142 and 143. These guide plates are supported at their outer or rearward ends by being slidably mounted on the adjacent ends of the guide plates 130 and 131. For so supporting the guide plates 142 and 143, I provide rollers 144 and 145 on the outside of the said guide plates 130 and 131, which rollers receive the top and bottom edges of the guide plates 142 and 143, as clearly shown in Fig. 7. It will also be understood that the outer ends of the guide plates 142 and 143 are adjustable with the adjacent ends of the guide plates 130 and 131 through the agency of the screw 137 and hand wheel 139.

The inner or front ends of the guide plates 142 and 143 are connected by means of brackets 146 and 147 respectively, to an adjusting screw 148, which is rotatably mounted in brackets 149 carried by the portable frame 31. The screw 148 serves to support the adjacent ends of the guide plates 142 and 143 and one end of the screw is squared as indicated at 150, to facilitate rotation thereof by means of a wrench or detachable hand wheel or the like.

Intermediate their ends, the guide plates 142 and 143 are similarly adjustably supported by means of a supporting bar 151 and an adjusting screw 152, these parts being suitably supported at their ends by brackets 153 which are carried by the portable frame 31.

It will be seen that the above described mounting for the guide plates 142 and 143 permits the same to move longitudinally of the feed conveyor 43 in unison with such movement of the portable frame 31. The elevated position of the horizontal portion of the feed conveyor 43 with respect to the plane of the supply conveyor 25, permits the guide plates 142 and 143 to project over the conveyor 25 in case the mattress filling operation proceeds to a point where the portable frame approaches the rear-most portion of the feed conveyor 43.

An adjusting screw 154, similar to the adjusting screw 148 and mounted in extensions of the brackets 149, may be provided for effecting adjustment of the width of the tick support 36. This mechanism being well known in the art, need not be further described in this application. For the same reason, means for adjustably mounting and effecting adjustment of the inclination of the upper conveyor 34, whereby the extent of compression of the filling material strip is controlled, need not be specifically described. However, I have shown the conveyor 34 as including side arms 155 which are pivoted on the shaft 156 of the rear sprockets of the conveyor, the front ends of the said side arms being vertically adjustable through the agency of adjusting screws, such as shown at 157 (Fig. 6).

In the description of the mattress filling operation hereinbefore given, I have indicated that the portable frame may not always be returned to its initial starting position before commencing successive filling operations. This, of course, would be due to the operator's speed in removing filled mattress ticks and substituting empty mattress ticks as compared with the speed of travel of the feed conveyor 43. However, it will be obvious that if desired, the speed of the feed conveyor 43 and other parts effected thereby, may be increased so that the machine may be continuously operated, using only the length of the feed conveyor 43 necessary to fill the mattress. In other words, the machine may be caused to operate fast enough to keep up with the operator of the machine. Of course, speeding up of the feed conveyor 43 includes provision for the continuation of the supply of filling material as required for the particular mattress ticks to be filled.

I am aware that changes may be made in the described form and construction of a mattress filling machine embodying the principles of my invention but without departing from the spirit thereof, the scope of which should be determined by reference to the following claims, which should be construed as broadly as possible consistent with the state of the art.

I claim as my invention:

1. In combination in a mattress filling machine, means for continuously propelling a strip of mattress filling material, means for supporting a mattress tick to receive said propelled filling material strip, and means for advancing said tick support relative to said filling material strip, thereby to speed up the tick filling operation.

2. In a machine of the class described, the combination of means for continuously propelling a strip of mattress filling material, means for supporting a mattress tick to receive the strip propelled by said means, means for advancing said tick support relative to said filling material strip so as to, in effect, feed said filling material into said tick faster than the material is fed by said conveyor, thereby incidentally emptying a portion of the length of said conveyor, and means operable after said tick is filled, for effecting return movement of said tick support, thereby permitting the filling material strip to be fed forward continuously to fill said emptied conveyor length while said filled tick is being removed from said tick support and while an empty tick is being mounted thereon.

3. In a machine of the class described, the combination of a continuously operating filling strip forming machine including a conveyor for continuously propelling the formed strip away from the machine, a continuously propelled receiving conveyor for receiving the strip from said strip forming machine conveyor, means for supporting a tick to receive said filling material strip from said receiving conveyor, and means for advancing said tick support relative to said receiving conveyor, thereby to speed up the tick filling operation.

4. In a machine of the class described, the combination of a continuously operating filling strip forming machine including a conveyor for continuously propelling the formed strip away from the machine, a continuously propelled receiving conveyor for receiving the strip from said strip forming machine conveyor, means for supporting a tick to receive said filling material strip from said receiving conveyor, means for advancing said tick support relative to said receiving conveyor, whereby said material is, in effect, fed into said tick faster than the material is fed by said conveyor, and whereby a portion of the length of said conveyor is emptied of filling material, and means operable after said tick is filled for effecting return movement of said tick support, thereby permitting the filling material strip to be fed forward continuously to fill up said emptied conveyor length while said filled tick is being removed from said tick support and while an empty tick is being mounted thereon.

5. In a machine of the class described, the combination of a continuously propelled conveyor for feeding mattress filling material, front and rear rolls for supporting the front and rear ends of said conveyor, means intermediate said rolls providing an offset in the plane of the upper reach of said conveyor, normally located adjacent the front end of the conveyor and said means being movable longitudinally of the conveyor to vary the location of said offset in the length of said upper reach, a tick support for supporting a tick to receive said filling material from said conveyor at said offset, means for effecting rearward movement of said offset forming means, and means for causing said tick support to move in unison with said offset forming means so as to effect feeding of the filling material into the tick faster than said material is propelled by said conveyor.

6. In a machine of the class described, the combination of a continuously propelled conveyor for feeding mattress filling material, front and rear rolls for supporting the front and rear ends of said conveyor, means intermediate said rolls providing an offset in the plane of the upper reach of said conveyor, said means being normally located adjacent the front end of the conveyor and movable longitudinally of the conveyor to vary the location of said offset in the length of said upper reach, a tick support for supporting a tick to receive said filling material from said conveyor at said offset, means for effecting rearward movement of said offset forming means, means for causing said tick support to move in unison with said offset forming means so as to effect feeding of the filling material from the conveyor into the tick faster than said material is propelled by said conveyor, whereby a portion of the length of said conveyor is emptied of filling material, and means for effecting return movement of said tick support and offset forming means, thereby permitting said emptied conveyor length to be refilled while the filled tick is being removed from said tick support and while an empty tick is being mounted thereon.

7. In a machine of the class described, the combination of a continuously driven conveyor for propelling a strip of mattress filling material, means communicating with said conveyor intermediate its ends for discharging said material therefrom, a tick support for holding a tick in position to receive filling material from said discharge means, and means for effecting simultaneous, unitary movement of said tick support and discharge means rearwardly of said conveyor, thereby, in effect, to feed filling material into the tick faster than said material is fed by said conveyor.

8. In a machine of the class described, the combination of a continuously driven conveyor for propelling a strip of mattress filling material, means communicating with said conveyor intermediate its ends for discharging said material therefrom, a tick support for holding a tick in position to receive filling material from said discharge means, means for effecting simultaneous, unitary movement of said tick support and discharge means rearwardly of said conveyor, thereby, in effect, to feed filling material into the tick faster than said material is fed by said conveyor, and whereby a portion of the length of said conveyor is emptied of filling material, and means for effecting return movement of said tick support and discharge means, thereby permitting said emptied conveyor length to be refilled while said filled tick is being moved from said tick support and while an empty tick is being mounted thereon.

9. In a machine of the class described, the combination of a continuously propelled endless conveyor belt for propelling tick filling material, front and rear rolls for supporting the ends of said conveyor belt, means intermediate said front and rear rolls and associated with the upper reach of said conveyor for providing an offset in said upper reach, means for supporting a mattress tick in position to receive said filling material from said conveyor at said offset, means for effecting rearward movement of said offset forming means and tick supporting means relative to said conveyor, whereby, in effect, filling material is discharged from said conveyor into said tick faster than such material is fed by the conveyor and whereby a portion of the length of said upper reach is emptied of filling material, and means for effecting return movement of said offset forming means and tick support, thereby permitting said emptied conveyor length to be refilled while the filled tick is being removed from said tick support and while an empty tick is being mounted thereon.

10. A machine of the class described, the combination of an endless belt conveyor for propelling a strip of mattress filling material, front and rear end rolls supporting the front and rear ends of said conveyor belt, a pair of rolls, associated with the upper reach of said belt conveyor and forming an offset therein, said pair of rolls being movable longitudinally of the conveyor so as to vary the location of said offset in the length of said upper reach, a tick support, means for receiving said tick filling material from said conveyor at said offset and guiding the same into a tick mounted on said support, means for effecting simultaneous movement of said offset, receiving and guiding means, and tick support, rearwardly of said conveyor whereby, in effect, filling material is discharged from said conveyor into said tick, faster than said material is fed by said conveyor, and whereby a portion of the length of said upper reach is emptied of filling material, and means for effecting simultaneous return movement of said parts, thereby permitting emptied conveyer length to be refilled while the filled tick is being removed from said support and while an empty tick is being mounted thereon.

11. In a machine of the class described, the combination of a continuously propelled belt conveyor for feeding filling material, a pair of rotatably mounted rolls associated with the upper reach of said conveyor and arranged so as to form an offset in said upper reach intermediate the ends thereof, a tick support having means for supporting a tick to receive filling material from said conveyor at said offset, said tick support and said pair of offset forming rolls being mounted so as to be movable in unison, longitudinally of said conveyor, means for effecting rearward movement of said parts relative to said conveyor, whereby filling material is fed from said conveyor into a tick carried by said tick support, faster than the material is fed by said conveyor and whereby a portion of the length of said upper reach is emptied of filling material, and means for effecting return movement of said parts after the tick is filled, thereby permitting said emptied conveyor portion to be refilled while the filled tick is being removed from said support and while an empty tick is being mounted thereon.

12. In a machine of the class described, the combination of a continuously propelled belt conveyor for feeding filling material, said conveyor being of considerably greater length than the normal length of a mattress, a pair of rotatably mounted rolls associated with the upper reach of said conveyor and arranged so as to form an offset in said upper reach intermediate the ends thereof, a tick support having means for supporting a tick to receive filling material from said conveyor at said offset, said tick support and said pair of offset forming rolls being mounted so as to be movable in unison, longitudinally of said conveyor, means for effecting rearward movement of said parts relative to said conveyor, so as to feed filling material into a tick carried by said support and whereby a portion of the length of said upper reach is emptied of filling material, and means for effecting return movement of said parts after the tick is filled, thereby permitting said emptied conveyor portion to be refilled while the filled tick is being removed from said support and while an empty tick is being mounted thereon, the excess length of said conveyor permitting successive filling operations to be started before the entire length of said conveyor is refilled with filling material.

13. In a machine of the class described, the combination of a continuously driven belt conveyor for feeding filling material, said conveyor including relatively fixed front and rear supporting rolls, a portable frame, movable longitudinally of said conveyor, a tick support carried by said frame, means also carried by said frame for effecting feeding of filling material from said conveyor into a tick mounted on said tick support, said means being operative to feed said material from said conveyor intermediate said front and rear supporting rolls, means for effecting movement of said frame and parts carried thereby rearwardly of said conveyor, thereby, in effect, to feed filling material into the tick faster than said material is fed by said conveyor and whereby a portion of the length of said conveyor is emptied of filling material, and means for effecting return movement of said frame and parts, thereby permitting said emptied conveyor length to be refilled while said filled tick is being removed from said tick support and while an empty tick is being mounted thereon.

14. In a machine of the class described, the combination of a continuously driven belt conveyor for feeding filling material, said conveyor including relatively fixed front and rear supporting rolls, a portable frame, movable longitudinally of said conveyor, a tick support carried by said frame, means also carried by said frame for effecting feeding of filling material from said conveyor into a tick mounted on said tick support, said means being operative to feed said material from said conveyor intermediate said front and rear supporting rolls, power means for independently actuating said belt conveyor and said portable frame, clutch means for selectively engaging and disengaging said power means for effecting rearward movement of said portable frame and parts carried thereby relative to said conveyor, thereby, in effect, to feed filling material into the tick faster than said material is fed by said conveyor, and whereby a portion of the length of said conveyor is emptied of filling material, means for effecting return movement of said portable frame when said clutch is disengaged, thereby permitting said filling material conveyor to be continuously propelled and said emptied conveyor length refilled while said filled tick is being removed from said tick support and while an empty tick is being mounted thereon.

15. In a machine of the class described, the combination of a continuously propelled belt conveyor for feeding filling material, means for continuously supplying filling material to said conveyor, a portable frame, movable longitudinally of said feed conveyor, a tick support carried by said frame, a pair of rolls carried by said frame and associated with the upper reach of said feed conveyor to provide an offset therein, a pair of vertically spaced conveyors carried by said frame for receiving filling material at said offset from said feed conveyor and operative to compress the material and to feed same into a tick mounted on said tick support, power means for effecting movement of said frame and the parts carried thereby rearwardly of said feed conveyor, thereby, in effect, to feed filling material into said tick faster than said material is fed to said feed conveyor and whereby a portion of the length of the latter is emptied of filling material, and means for effecting return movement of said portable frame and associated parts, thereby permitting said filling material supply means to supply material to said emptied conveyor length while the filled tick is being removed from said tick support and while an empty tick is being mounted thereon.

16. In a machine of the class described, the combination of a continuously propelled belt conveyor for feeding filling material, means for continuously supplying filling material to said conveyor, a portable frame, movable longitudinally of said feed conveyor, a tick support carried by said frame, a pair of rolls carried by said frame and associated with the upper reach of said feed conveyor to provide an offset therein, a pair of vertically spaced conveyors carried by said frame for receiving filling material at said offset from said feed conveyor and operative to compress the material and to feed same into a tick mounted on said tick support, gears connecting one of said offset forming rolls with one of said pair of conveyors, power means for driving said vertically spaced conveyors independently of said feeding conveyor and operative to effect rotation of said offset forming roll at a greater circumferential speed than the speed of travel of said feeding conveyor, thereby to effect rearward movement of said frame and associated parts relative to said feed conveyor, whereby, in effect, filling material is fed into said tick faster than said material is supplied to said feed conveyor by said supply means and whereby a portion of the length of said feed conveyor is emptied of filling material, means for disengaging said vertically spaced conveyor actuating power means, whereby the travel of said feeding conveyor is imparted to said portable frame to effect return movement of the same and whereby said filling material supply means is permitted to continue supplying material to said feed conveyor to fill up said emptied length while the filled tick is being removed from said tick support and while an empty tick is being mounted thereon.

17. In a machine of the class described, the combination of a continuously propelled belt conveyor for feeding filling material, said conveyor including front and rear supporting rolls, means for continuously supplying filling material to said conveyor, a portable frame movable longitudinally of said conveyor, a tick support carried by said frame, means carried by said frame for receiving filling material from said conveyor intermediate said front and rear rolls and operative to compress and feed the material into a tick carried by said tick support, means for effecting rearward movement of said frame and parts carried thereby relative to said conveyor, whereby filling material is, in effect, fed from said conveyor into a tick carried by said tick support faster than said material is fed by said conveyor, a side guide longitudinally slidably mounted over said conveyor for controlling the width of the filling material thereon, said guide being connected with said portable frame so as to move therewith, and means for effecting return movement of said portable frame and associated parts, thereby permitting filling material to be supplied to said emptied conveyor length while the filled tick is being removed from said tick support and while an empty tick is being mounted thereon.

18. In a machine of the class described, the combination of a continuously propelled belt conveyor for feeding filling material, said conveyor including front and rear supporting rolls, means for continuously supplying filling material to said conveyor, a portable frame movable longitudinally of said conveyor, a tick support carried by said frame, means carried by said frame for receiving filling material from said conveyor intermediate said front and rear rolls and operative to compress and feed the material into a tick carried by said tick support, means for effecting rearward movement of said frame and parts carried thereby, whereby filling material is, in effect, fed from said conveyor into a tick carried by said tick support faster than said material is fed by said conveyor, a side guide longitudinally slidably mounted over said feed conveyor for controlling the width of the filling material thereon, said guide being connected with said portable frame so as to move therewith, means for effecting adjustment of said guide crosswise of the conveyor, and means for effecting return movement of said portable frame and associated parts, thereby permitting filling material to be supplied to said emptied conveyor length while the filled tick is being removed from said tick support and while an empty tick is being mounted thereon.

19. In a machine of the class described, the combination of a continuously driven feed conveyor for feeding filling material, said conveyor including front and rear supporting rolls and having an upwardly inclined receiving end portion and a substantially horizontal main portion, means substantially coplanar with the receiving end of said feed conveyor for continuously supplying filling material to the latter, means movable longitudinally of said feed conveyor for receiving filling material therefrom and feeding the same into a mattress tick, means for effecting rearward movement of said receiving and tick filling means relative to said feed conveyor, a side guide associated with said upwardly inclined conveyor portion for controlling the width of the material thereon, another guide associated with said substantially horizontal main conveyor portion, slidably mounted adjacent one end on said first mentioned guide and secured at its other end to said receiving and tick filling means so as to be movable longitudinally therewith, the elevated position of said longitudinally slidable guide permitting the same to extend over the adjacent portion of said filling material supply means when said tick filling means is moved rearwardly of the feed conveyor a substantial distance, means for effecting adjustment of said guides crosswise of said feed conveyor, and means for effecting return movement of said tick filling means.

20. In a machine of the class described, the combination of a comparatively long filling material feed conveyor including front and rear supporting rolls, means intermediate said front and rear rolls forming an offset in the upper reach of said conveyor, means for supporting said offset forming means so as to permit adjustment thereof longitudinally of said conveyor, whereby the location of said offset in the length of said upper reach may be varied, a plurality of means intermediate said offset forming means and said rear supporting roll for supporting the intermediate length of said upper reach, said means being independently movable relative to said upper reach and relative to each other, thereby permitting the same to be relatively adjusted as an incident to longitudinal adjustment of said offset forming means, and means for effecting predetermined spacing of said supporting means as an incident to adjustment of said offset forming means to its extreme forward position.

21. The method of making mattresses which comprises continuously forming and propelling a web of mattress filling material, effecting insertion of a forward end portion of the web into a mattress tick, then removing the filled mattress tick and positioning an empty tick for a succeeding filling operation while continuing the propulsion of said web.

22. The method of making mattresses which comprises continuously forming and propelling a web of mattress filling material, effecting insertion of a forward end portion of the web into a mattress tick faster than the web is propelled, then removing the filled mattress tick and positioning an empty tick for a succeeding filling operation while continuing the propulsion of said web.

23. The method of making mattresses having composite fillers which comprises continuously forming and depositing a layer of felted filler web material on a travelling support, depositing a layer of unfelted material on top of said felted layer while the latter travels with said support, then forming and depositing a layer of felted material on top of said unfelted layer, thereby forming a composite mattress filler web, effecting insertion of a forward end portion of said composite web into a mattress tick while maintaining the continuous travel of said web and then removing the filled mattress tick and positioning an empty tick for a succeeding filling operation while continuing the travel of said web.

JOHN F. GAIL.